United States Patent
Li et al.

(10) Patent No.: US 10,101,495 B2
(45) Date of Patent: Oct. 16, 2018

(54) MAGNETO-SEISMIC EXPLORATION METHOD AND SYSTEM

(71) Applicant: ExxonMobil Research and Engineering Company, Annandale, NJ (US)

(72) Inventors: Qiuzi Li, Clinton, NJ (US); Harry W. Deckman, Clinton, NJ (US); Mehmet Deniz Ertas, Bethlehem, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/444,803

(22) Filed: Feb. 28, 2017

(65) Prior Publication Data

US 2017/0261642 A1    Sep. 14, 2017

Related U.S. Application Data

(60) Provisional application No. 62/306,166, filed on Mar. 10, 2016.

(51) Int. Cl.
*G01V 11/00* (2006.01)

(52) U.S. Cl.
CPC .... *G01V 11/007* (2013.01); *G01V 2210/1293* (2013.01); *G01V 2210/1295* (2013.01); *G01V 2210/1297* (2013.01); *G01V 2210/1299* (2013.01); *G01V 2210/1425* (2013.01); *G01V 2210/1427* (2013.01); *G01V 2210/1429* (2013.01); *G01V 2210/624* (2013.01)

(58) Field of Classification Search
CPC ......... G01V 11/007; G01V 2210/1293; G01V 2210/1295; G01V 2210/1297; G01V 2210/1299; G01V 2210/1425; G01V 2210/1427; G01V 2210/1429; G01V 2210/624

USPC ........................................................ 367/21
See application file for complete search history.

(56) References Cited

U.S. PATENT DOCUMENTS 4,617,518 A    10/1986    Srnka et al.
5,877,995 A    3/1999    Thompson et al.
(Continued)

FOREIGN PATENT DOCUMENTS

EP    0512756 A1    11/1992

OTHER PUBLICATIONS

International Search Report and Written Opinion PCT/US2017/019898 dated May 17, 2017.

*Primary Examiner* — Daniel L Murphy
(74) *Attorney, Agent, or Firm* — Andrew T. Ward; Joseph E. Wrkich

(57) ABSTRACT

Systems and methods are provided for a magneto-seismic exploration of a subsurface region. An electromagnetic source may transmit time-varying electromagnetic field into the subsurface region, in the presence of a static or time-varying magnetic field, such that a component of the electric field associated with the time-varying electromagnetic field is substantially parallel to an interface between two subsurface formations in the subsurface region, wherein the electric field interacts with the static or time-varying magnetic field and creates a Lorentz force in each of the subsurface formations. One or more seismic receivers may detect a seismic signal generated by a Lorentz force change at the interface between the two subsurface formations. A computer system may be programmed to process and present the detected seismic signal.

34 Claims, 9 Drawing Sheets

(56) References Cited

U.S. PATENT DOCUMENTS

| | | |
|---|---|---|
| 6,477,113 B2 | 11/2002 | Hornbostel et al. |
| 6,664,788 B2 | 12/2003 | Hornbostel et al. |
| 7,925,443 B2 | 4/2011 | Wahrmund et al. |
| 8,014,988 B2 | 9/2011 | Wahrmund et al. |
| 2005/0174119 A1 | 8/2005 | Ligneul et al. |
| 2014/0254317 A1 | 9/2014 | Thompson et al. |

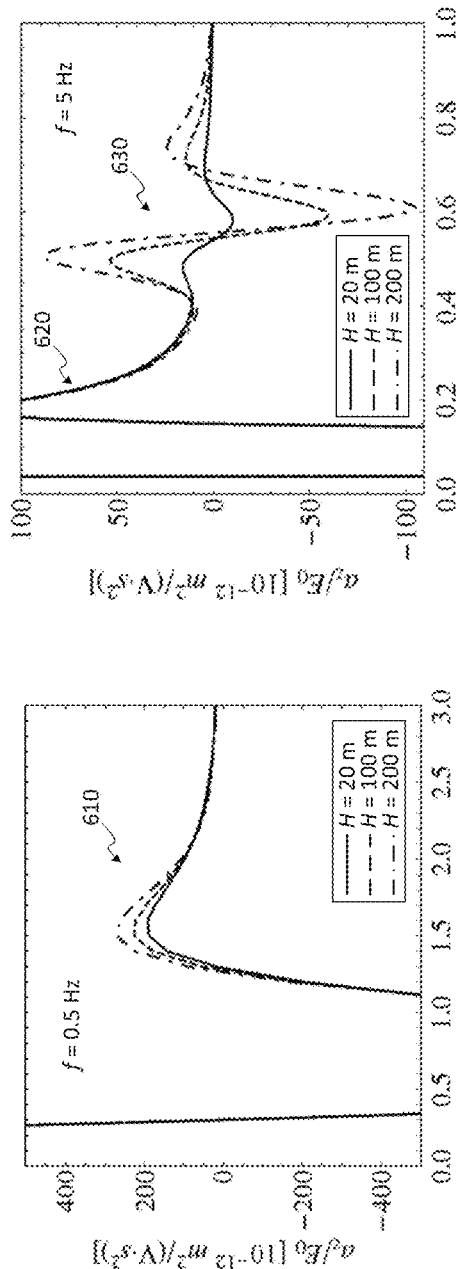
FIG. 6A
FIG. 6B
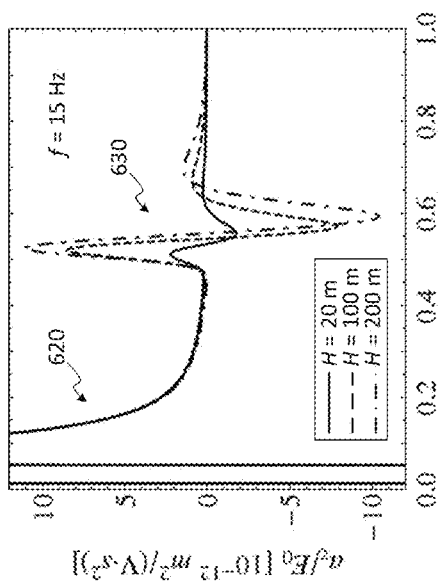
FIG. 6C

900

MAGNETO-SEISMIC EXPLORATION METHOD AND SYSTEM

CROSS-REFERENCE TO RELATED APPLICATIONS

This application claims priority to U.S. Provisional Application Ser. No. 62/306,166 filed on Mar. 10, 2016, herein incorporated by reference in its entirety.

BACKGROUND

The present disclosure relates to imaging of subsurface structures and hydrocarbon deposits. Specifically, the present disclosure relates to producing a seismic response in subsurface formations by applying a time-varying electromagnetic field into the subsurface structures in the presence of a static or time-varying magnetic field, and detecting the seismic response.

Seismic surveys are commonly used in hydrocarbon exploration. Processed seismic surveys provide information about structures of geologic layers and, in some cases, can predict fluid properties within the geologic layers. However, in seismic surveys, it is difficult to distinguish a formation containing hydrocarbon from a formation containing brine since seismic velocities from these two formations may differ by only a few percent. Assessments of hydrocarbon content from seismic surveys thus need to be corroborated by incorporating other geophysical data.

A distinguishable physical property between hydrocarbon and brine is resistivity/conductivity. It is to be noted that the terms resistivity and conductivity may be used interchangeably herein, and it is understood that one of these terms is the inverse of the other. Obtaining an accurate map of subsurface conductivity thus can be advantageous. A reservoir rock filled with brine when compared to a reservoir rock filled with hydrocarbons may exhibit a contrast of 10-100 times in conductivity. In other words, subsurface conductivity can be particularly useful in distinguishing a brine-saturated formation from a hydrocarbon-saturated formation.

One conventional technique used for obtaining subsurface resistivity maps is controlled-source electromagnetics (CSEM). To detect the presence of hydrocarbon at a presumed depth, CSEM typically employs a current dipole as a source. The dipole transmits an electromagnetic field into the subsurface, and receivers at the surface are used to measure electromagnetic fields reflected by subsurface formations. The vast majority of CSEM surveys are done in the frequency domain where amplitudes and phases of the reflected electromagnetic fields are recorded. For these frequency-domain surveys, the difference between electromagnetic fields from subsurface formations with and without hydrocarbon is most distinguishable when the receivers are placed at a far offset from the source relative to the presumed depth of the hydrocarbon, such that direct coupling between the source and the receivers is minimized.

However, images produced through a model-based inversion process using CSEM data recorded by the receivers exhibit poor spatial resolution. The poor spatial resolution is due to the fact that electromagnetic radiation propagates diffusively in the subsurface, and even more so when the frequency of the electromagnetic field from the source is low. In CSEM, the frequency of the transmitted electromagnetic field is typically kept low (e.g., in the range of 0.1-5 Hz) because there is a practical upper limit on the frequency. This upper limit results from the fact that time-varying electromagnetic fields tend to decrease exponentially in subsurface formations due to attenuation. Diffusive propagation occurs because the Earth has a modest electrical conductivity giving rise to a skin effect phenomenon. The electric fields tend to decrease faster as the conductivities of subsurface formations increase and as the frequency of the electromagnetic field from the source increases. Therefore, for deeper targets, there is a limit to the achievable spatial resolution of the resistivity maps.

Moreover, in CSEM, the inversion process is inherently ill-posed, or under-constrained, and thus requires heavy regularization and/or substantial prior information and assumptions in order to converge to a solution. Consequently, the inversion process is susceptible to producing inaccurate resistivity maps since different subsurface models may yield the same measurements by the receivers.

There are other methods that also measure the electrical response of the subsurface to generate resistivity maps. These methods usually differ by the acquisition geometry, specifically, by the placement of the source and receivers. Some of them use a vertical dipole source, some detect time-domain signals, while others measure field gradients instead of the fields. However, all of these methods still suffer from the same limitations associated with skin depth and the diffusive nature of the electromagnetic fields in the subsurface, as mentioned above.

Another technique known as electro-seismics—sometimes referred to as electrokinetics—relies on electromagnetic energy to seismic energy conversion resulting from electrokinetically induced fluid movement at interfaces between subsurface formations. Electro-seismics uses a source to transmit an electromagnetic field into the subsurface and receivers at the surface to measure seismic signals, or waves, generated from the conversion. Seismic response from a layer in the Earth comes from the electric field perpendicular to a layer and the change in the electrokinetic coupling coefficient between the layer and its adjacent layers. The response is subject to tuning effects where electrokinetic conversion from the top and bottom of the layer produces a seismic interference. This electro-seismics technique can, in some instances, produce high resolution images using seismic imaging types of algorithms and does not have to rely on an inversion method. However, the measured seismic signals depend on properties of the subsurface formations, such as electrokinetic coupling coefficients and permeabilities, which are usually poorly constrained. Consequently, it is often difficult to correctly interpret the measured seismic signals because they are not necessarily proportional to the thickness of the resistive anomaly.

In light of the above described drawbacks of conventional technologies, the inventors recognized a need in the art to develop alternative methods to generate subsurface conductivity maps that overcome or improve upon such limitations.

BRIEF DESCRIPTION OF THE FIGURES

FIGS. 6A-6C illustrate examples of magneto-seismic signals for thin hydrocarbon layers at different source frequencies according to an embodiment of the present disclosure.

DETAILED DESCRIPTION

Figure 1:
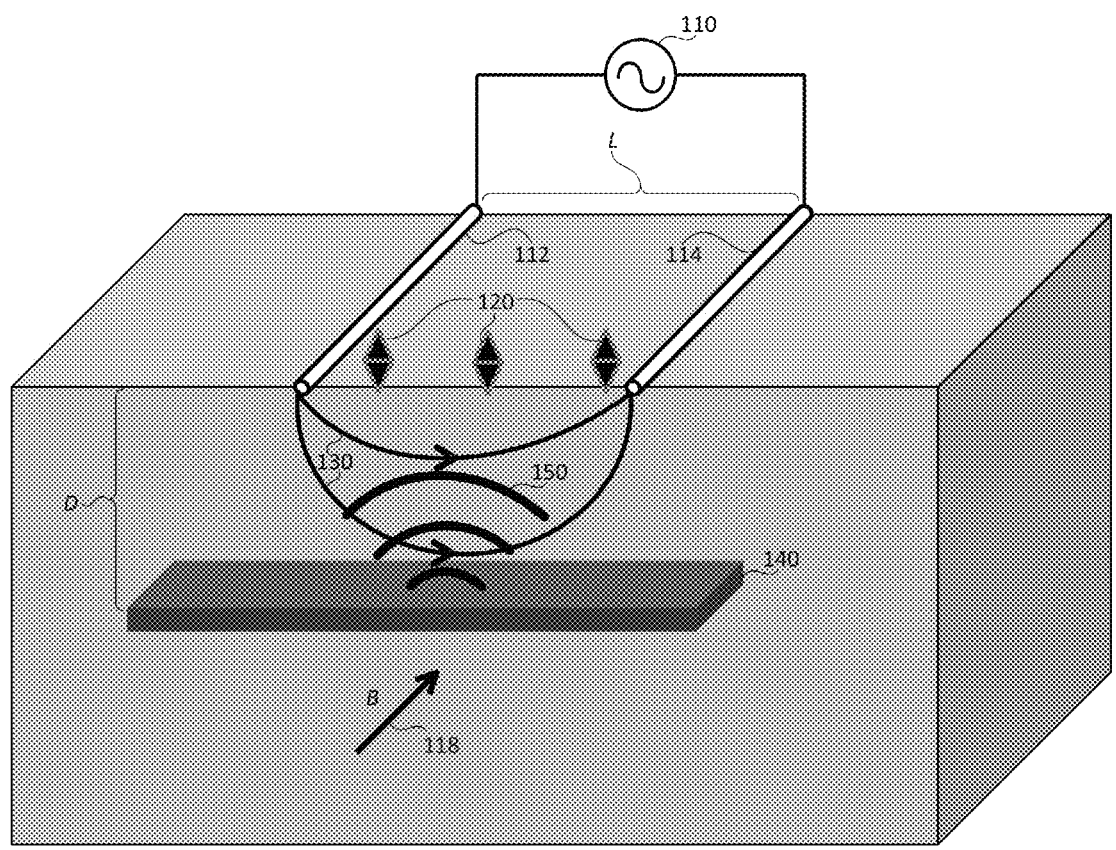
FIG. 1 illustrates a simplified diagram of a magneto-seismic exploration setup according to an embodiment of the present disclosure.

The present invention pertains to the study of the subsurface which includes rock formations, structures, and other features beneath the land or sea-floor surface. The magnetoseismic geophysical survey technique described herein explores a portion of the subsurface and this portion will be referred to as a subsurface region. The subsurface region surveyed will typically contain formations which are a rock body that is lithologicaly distinguishable from others. Geologists often divide formations into members which in turn are subdivided into beds.

Embodiments of the present disclosure provide systems and methods for a magneto-seismic exploration of a subsurface region. The invention involves the creation of a time varying electromagnetic wave that propogates in the subsurface region being explored. The wave propogates into the subsurface region from a source which may be electrodes that in some instances are arranged to form a dipole antenna, or electrodes that are arranged as parallel lines (referred to as a railroad track electrode), or other electrode configurations or a magnetic induction coil. Because the dipole has two points from which current flows, we refer to it as a pair of dipole electrodes. Similarly for the railroad track configuration we refer to the electrodes as a pair of railroad track electrodes.

The source is coupled to and powered by an electromagnetic power source which may be a voltage or current source capable of driving a time varying current in the source. The time varying current flowing through the source produces the time varying electromagnetic wave. Nonlimiting examples of time varying currents and hence electromagnetic fields that replicate the time variance of the current near the source are sinusoidal waves, triangular waves, frequency modulated sinusoidal waves, amplitude modulated sinusoidal waves, pulses, sequence of pulses, wavelets, bipolar pulses, bipolar wavelets, heavyside functions and combinations of these. When pulses are employed, the pulse shape may be chosen from a wide variety of shapes such as a wavelet (such as a Ricker wavelet), a square pulse, a triangular pulse or a rounded pulse. When electrodes are used, the time varying current is injected directly into the subsurface when the survey is done on land and into either the water column or subsurface when the survey is done offshore or in a lake or marsh. This time varying injected current generates the time varying electromagnetic field. When a magnetic induction coil is used, the time varying current produces a time varying magnetic field near the magnet which becomes the source of the time varying electromagnetic field that propogates in the subsurface. The frequency content of the source can be characterized by Fourier transforming the time dependence of the current flowing from the electromagnetic power source. As the wave diffusively propagates away from the source the higher frequency Fourier components will be more attenuated than the lower frequency components.

Because of the linearity of electromagnetic wave propagation equations, the same frequency content will be present throughout the subsurface region being studied albeit with a different Fourier amplitude spectrum than near the source. As such if one wants to have a given frequency component present in the electromagnetic wave passing through a formation in the subsurface region one would make sure that the time varying current flowing from the electromagnetic power source had an appreciable Fourier amplitude at that frequency.

In all cases, the electromagnetic power source is configured to transmit a time-varying electromagnetic field into the subsurface region, in the presence of a static or time varying magnetic field, such that a component of the electric current associated with the time-varying electromagnetic field is substantially parallel to an interface between two subsurface formations in the subsurface region. Substantially parallel is taken to be a component that is within 60 degrees of some portion of the interface, more preferably within 45 degrees of a portion of the interface, more preferably within 20 degrees of a portion of the interface and even more preferably within 10 degrees of a portion of the interface. This component of the the electric current interacts with the static or time varying magnetic field to create Lorentz forces in each of the subsurface formations associated with this interface. A seismic receiver may detect a seismic signal generated by the difference in Lorentz forces (i.e. the Lorentz force change) across the interface between the two subsurface formations. Examples of seismic receivers include geophones, multi axis geophones, accelerometers, hydrophones, streamers. For land surveys, the seismic receivers are in contact with the earth which is the top of the subsurface region being studied. Offshore the seismic receivers may be located on the water column on on the sea floor. In all cases a computer system is used to record the data, and is programmed to process the data and present the detected seismic signal.

In this disclosure, the term "seismic" is not meant to restrict the frequency range of the signals that are being detected. The seismic waves that are generated by the Lorentz force will have the same frequencies that are present in the time-varying electromagnetic field, and are not meant to the limited to the traditional seismic frequency band. The preferred frequency ranges for the time-varying electromagnetic field, consequently that of the seismic signal in the various embodiments are disclosed below.

In this disclosure, the term "interface" is not strictly restricted to an interface between two subsurface formations in the subsurface region. The ocean bottom, an interface between the sea and the subsurface, is also treated as an "interface".

FIG. 1 illustrates, according to an embodiment of the present disclosure, a simplified diagram of a magneto-seismic exploration setup for imaging of subsurface structures and hydrocarbon deposits. The magneto-seismic exploration setup may include an electromagnetic power source 110 capable of delivering a time-varying current (and hence a time-varying voltage) to electrodes 112 and 114, a magnetic field (referred to as a B field) 118, and a plurality of seismic receivers 120.

At one instant of time, the source 110 may drive the electrode 112 to a positive potential and the electrode 114 to a negative potential with respect to the electrode 112. The magnetic field 118 may be the Earth's magnetic field, or a magnetic field from an electromagnet or, in some instances, a permanent magnet. The source 110 may produce pulses, coded waveforms, swept frequency waveforms, or other time-varying waveforms of current. The electrodes 112 and 114 may provide a means of injecting the current into the Earth to produce a time-varying electromagnetic field that propagates in a subsurface formation.

In the embodiment, as shown in FIG. 1, the electrodes 112 and 114 may be deployed onshore. The electrodes 112 and 114 may also be disposed on, near, or buried into the surface of the Earth with means to provide good contact with the ground. At one point in time, when the electrode 112 is positive and the electrode 114 is negative, currents between the electrodes 112 and 114 may follow paths of an electromagnetic field 130. By Ohm's law, the current paths and the paths of the electromagnetic field 130 are similar. At a later point in time, the source 110 may reverse the electrode polarity such that the electromagnetic field 130 is time varying. Depending on the temporal field that is to be produced, the current injection may be temporally paused at another point in time. These temporal changes may produce a time-varying electrode potential and hence an electrical current injection that may generate the time-varying electromagnetic field 130 in the subsurface. In some embodiments, the time-varying electromagnetic field 130 may be created by pulses, waveforms, coded waveforms such as Golay sequences, or swept frequency currents.

Figure 2:
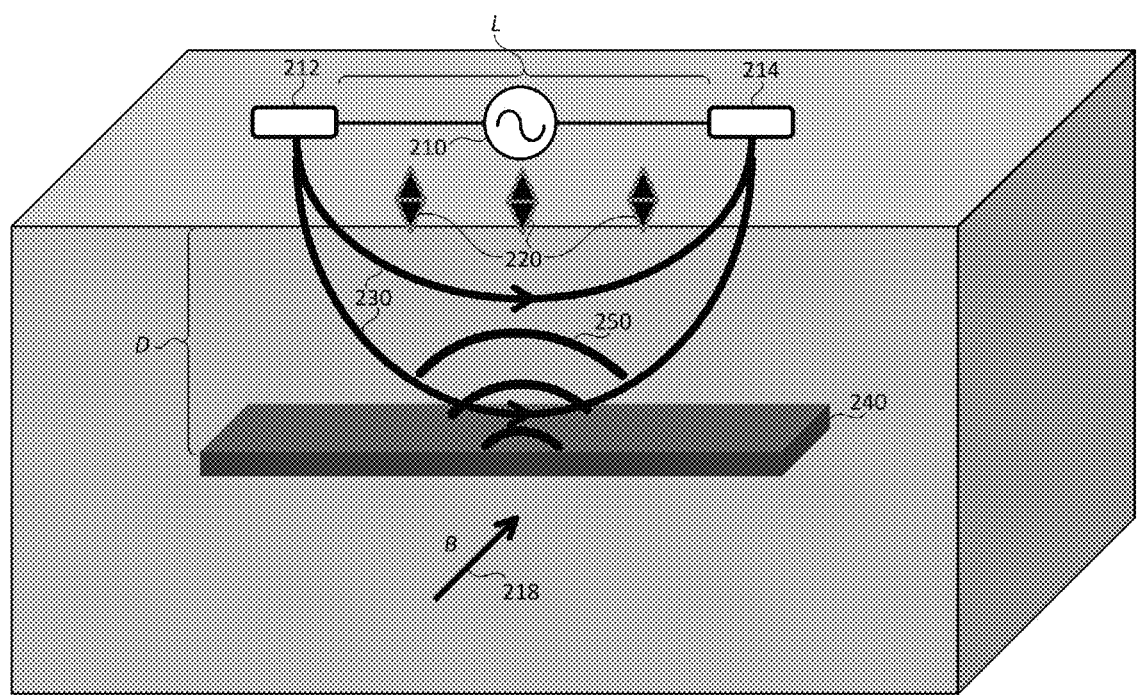
FIG. 2 illustrates a simplified diagram of an alternative magneto-seismic exploration setup according to an embodiment of the present disclosure.

As shown in FIG. 1, the electrodes 112 and 114 may be in a railroad track configuration. The source electrode configuration is, however, not limited to this railroad track configuration. For example, according to another embodiment of the present disclosure, FIG. 2 illustrates a simplified diagram of an alternative magneto-seismic exploration setup, which may include an electric power source 210 capable of delivering a time-varying current (and hence a time-varying voltage) to electrodes 212 and 214, a magnetic field (referred to as a B field) 218, and a plurality of seismic receivers 220. Unlike the electrodes 112 and 114 of FIG. 1, the electrodes 212 and 214 are arranged in a dipole configuration. At a point in time, the electrode 212 may be driven to a positive potential and electrode 214 may be driven to a negative potential (with respect to the electrode 212) by the power source 210. At another point time, the power source 210 may reverse the electrode polarity, thus creating a time-varying electromagnetic field 230. Currents between the electrodes 212 and 214 may follow paths of the electromagnetic field 230.

Those skilled in the art will be familiar with other means of transmitting a time-varying electromagnetic field to the subsurface. In another embodiment, the electrodes may be towed or placed on the seabed in offshore environments. In another embodiment, the electrodes may be placed in a wellbore. In another embodiment, the time-varying electromagnetic field may be induced by a magnetic source such as an induction coil, instead of the electrodes. In another embodiment, the time-varying electromagnetic field may be transmitted by magnetotelluric currents naturally present in the environment. In yet another embodiment, multiple sources and a multitude of electrodes or induction coils may be used.

A depth to which the electromagnetic field 130 (or 230) may efficiently penetrate the subsurface may be dictated by electrode geometry and spacing, background conductivity of the subsurface, and a frequency content of the electromagnetic field 130 (or 230) itself. It is preferred that the electromagnetic field 130 (or 230) have a significant energy content in a frequency range between 0.0001 Hz and 10,000 Hz, more preferably between 0.001 Hz and 1,000 Hz, and most preferably between 0.01 and 100 Hz. The frequency content near the source can be determined from a Fourier transform of the temporal variation of the current flowing through the electrodes. The electrode 112 (or 212) and the electrode 114 (or 214) may be disposed at a distance L apart from each other. Typically, the distance L may be chosen to be about equal to a presumed depth D of a resistive layer 140 (or 240), which may be a subsurface formation of interest. An estimate of the depth D may be obtained a priori from other geophysical surveys, for example.

The time-varying electromagnetic field 130 (or 230) generated by the source 110 (or 210) may penetrate and propagate in the subsurface of the Earth and may reach the resistive layer 140 (or (240). When the time-varying electromagnetic field 130 (or 230) propagates to the top surface of the resistive layer 140 (or 240), the time-varying electromagnetic field 130 (or 230) may induce a change in current density across the top surface of the resistive layer 140 (or 240) due to an abrupt change in conductivity across the top surface. The change in current density interacting with the B field 118 (or 218) may result into a change in a body force density, known as the Lorentz force. The change in the Lorentz force in turn may generate a seismic wave 150 (or 250). As the time-varying electromagnetic field 130 (or 230) propagates to a bottom surface of the resistive layer 140 (or 240), another seismic wave (not shown) may be generated at the bottom surface of the resistive layer. The mechanism through which seismic waves are generated at interfaces between subsurface formations will be discussed in detail with respect to FIG. 3A below.

Thereafter, the seismic wave 150 (or 250) may be received by the plurality of receivers 120 (or 220), which are of seismic types. Examples of the receivers 120 (or 220) that may be used with an onshore configuration are classic seismic receivers or geophones that record the velocity of the motion of the Earth, as well as single- or multi-axis accelerometers. Examples of the receivers 120 (or 220) that may be used in an offshore configuration include pressure transducers, hydrophones, towed streamers, and ocean bottom nodes that may incorporate accelerometers. As shown in FIG. 1, the receivers 120 (or 220) may be disposed on, near, or buried into the surface of the Earth, in between the electrodes 112 (or 212) and 114 (or 214). Placing the receivers 120 (or 220) near the electrodes 112 (or 212) and 114 (or 214) or directly in between the electrodes 112 (or 212) and 114 (or 214) may be logistically advantageous given that the area needed for the exploration may be minimized. Although only three receivers 120 (or 220) are shown, it may be desirable to have as many receivers as possible to improve the spatial resolution of an image resulting from the magneto-seismic exploration. Furthermore, although the receivers 120 (or 220) are shown to be disposed in a line configuration, they may also be disposed in an array configuration, with regular or irregular spacing. The number of receivers and their layout are usually limited by logistical constraints. In some instances, more than 1,000 receivers may be used.

Figure 3A:
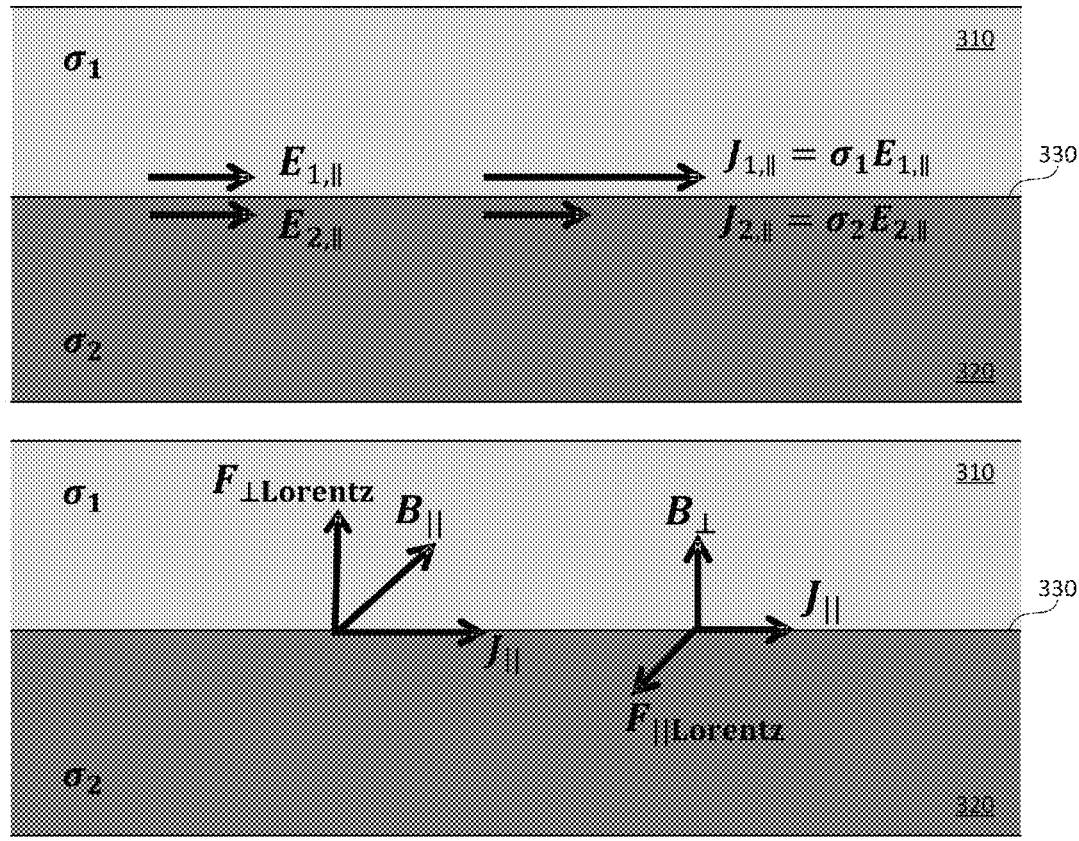
FIG. 3A is a visual representation of a magneto-seismic conversion according to an embodiment of the present disclosure.

FIG. 3A is a visual representation of a magneto-seismic conversion according to an embodiment of the present disclosure. FIG. 3A illustrates two exemplary subsurface formations: a first layer 310 having a first conductivity $\sigma_1$ and a second layer 320 having a second conductivity $\sigma_2$. The first layer 310 and the second layer 320 abut each other at an interface 330. For example, the first layer 310 may represent a rock layer saturated with brine, while the second layer 320 may represent a reservoir layer saturated with hydrocarbon. For another example, the first layer 310 may represent the ocean, while the second layer 320 may represent the subsurface. The ocean bottom is the interface 330. In both cases, the first conductivity $\sigma_1$ is relatively higher than the second conductivity $\sigma_2$.

A time-varying electromagnetic field (e.g., the electromagnetic field 130 or 230) may pass from the first layer 310 to the second layer 320. Generally, an electromagnetic field is a combination of an electric field and a magnetic field. At the interface 330, the electric field of the electromagnetic field may generally be decomposed into a component parallel to the interface 330 and another component perpendicular to the interface 330. Dictated by Faraday's law, the parallel component of the electric field may pass through the interface 330 unchanged. Thus, as shown in FIG. 3A, the electric field may be represented as having a first parallel component $E_{1,\|}$ on the first layer 310 side that is equal to a second parallel component $E_{2,\|}$ on the second layer side. Because the electric field is continuous across the interface 330, $E_{1,\|} = E_{2,\|} = E_{\|}$. However, as mentioned, on two sides of the interface 330, the first conductivity $\sigma_1$ may be higher than the second conductivity $\sigma_2$. Accordingly, a first current density (current per unit area) $J_{1,\|} = \sigma_1 E_{1,\|} = \sigma_1 E_{\|}$ on the first layer 310 side may be larger than a second current density $J_{2,\|} = \sigma_2 E_{2,\|} = \sigma_2 E_{\|}$ on the second layer 320 side due to the difference in conductivity between the two layers.

In general, in the presence of a magnetic field B, a current density J may give rise to a body force density F (force per unit volume), which is known as the Lorentz force and may be represented by equation (1).

$$F = J \times B \quad (1)$$

Thus, in the presence of a B field, such as the Earth's magnetic field or a static or time-varying magnetic field from an external source such as an electromagnet or permanent magnet, the first current density $J_{1,\|}$ and the second current density $J_{2,\|}$ may each result in an associated Lorentz force. As shown in FIG. 3A, a cross product of a current density $J_{\|}$ (representing either one of the first current density $J_{1,\|}$ and the second current density $J_{2,\|}$) with a component of the B field parallel to the interface 330 (i.e., $B_{\|}$) may result into a Lorentz force $F_{\perp Lorentz}$ perpendicular to the interface 330. A difference in perpendicular Lorentz forces associated with the first current density $J_{1,\|}$ and the second current density $J_{2,\|}$ may result in a differential Lorentz force $\Delta F_{\perp Lorentz}$, which in turn may generate a pressure/primary/compressional wave, commonly known as a p-wave.

Since the differential Lorentz force $\Delta F_{\perp Lorentz}$ results from a cross product, when the parallel component of the electric field (i.e., $E_{\|}$) and the parallel component of the B field (i.e., $B_{\|}$) are aligned (i.e. parallel to each other), there is no net force and hence no seismic response. In FIG. 3A, the parallel component of the electric field and the parallel component of the B field are perpendicular to each other. Hence, the differential Lorentz force $\Delta F_{\perp Lorentz}$ and the resulting seismic response are at a maximum. When parallel component of the electric field and the parallel component of the B field are perpendicular to each other, the differential Lorentz force $\Delta F_{\perp Lorentz}$ may be represented by equation (2).

$$\Delta F_{\perp Lorentz} = \sigma_1 E_{1,\|} B_{\|} - \sigma_2 E_{2,\|} B_{\|} \quad (2)$$
$$= \sigma_1 E_{\|} B_{\|} - \sigma_2 E_{\|} B_{\|}$$
$$= (\sigma_1 - \sigma_2) E_{\|} B_{\|}$$

The time variance of this differential Lorentz force $\Delta F_{\perp Lorentz}$ and hence the shape and the amplitude of the resulting compressional seismic wave launched from the interface 330 are determined by the way in which the parallel component of the electric field (i.e., $E_{\|}$) varies with time. This correspondence occurs because the time-varying differential Lorentz force $\Delta F_{\perp Lorentz}$ directly produces compressional seismic waves (p-waves) that launch from the interface 330 and propagate to the seismic receivers (e.g., 120 or 220).

Similarly, a cross product of a current density $J_{\|}$ with a component of the B field perpendicular to the interface 330 (i.e., $B_{\perp}$) may result in a Lorentz force $F_{\|Lorentz}$ parallel to the interface 330. In this case, the current density $J_{\|}$ will always be perpendicular to the perpendicular component of the B field $B_{\perp}$. A difference in parallel Lorentz forces associated with the first current density $J_{1,\|}$ and the second current density $J_{2,\|}$ may result in a differential Lorentz force $\Delta F_{\|Lorentz}$ represented by equation (3) and may generate a shear/secondary wave, commonly known as an s-wave. This shear wave is launched from the interface 330. The time variance of this differential Lorentz force $\Delta F_{\|Lorentz}$ and hence the shape and the amplitude of the resulting temporal shear wave are again determined by the way in which the parallel component of the electric field (i.e., $E_{\|}$) varies with time. This correspondence occurs because the time-varying differential Lorentz force $\Delta F_{\|Lorentz}$ directly produces shear s-waves that launch from the interface 330 that propagate to the seismic receivers (e.g., 120 or 220).

$$\Delta F_{\|Lorentz} = \sigma_1 E_{1,\|} B_{\perp} - \sigma_2 E_{2,\|} B_{\perp} \quad (3)$$
$$= \sigma_1 E_{\|} B_{\perp} - \sigma_2 E_{\|} B_{\perp}$$
$$= (\sigma_1 - \sigma_2) E_{\|} B_{\perp}$$

Therefore, the conversion from electromagnetic energy to seismic energy may result from a change or "jump" in Lorentz force at an interface between two layers having different conductivities. The magnitude of the seismic waves at the interface is proportional to the difference in conductivities of the two layers, the magnitude of the parallel component of the electric field $E_{\|}$, and the magnitude of the B field. The seismic waves are generated and launched at the interface. As such, interfaces between formations may be viewed as seismic sources that will be referred to as "exploding reflectors" below.

Figure 3B:
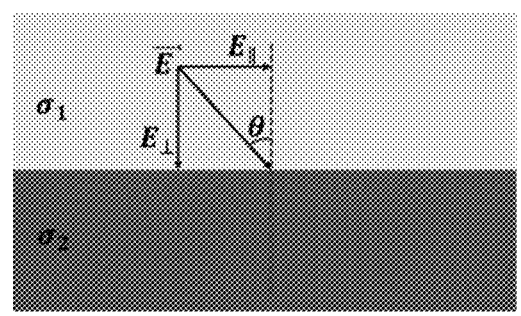
FIG. 3B illustrates the electric field parallel to an interface between two subsurface formations in the subsurface region.

The above discussion considered only the parallel component of an electric field of a time-varying electromagnetic field to the interface 330. In general, the electric field at an interface between two subsurface formations has both parallel and perpendicular components. The FIG. 3B specifies the electric field at an interface between two subsurface formations in the subsurface region. As shown in the FIG. 3B, the electric field parallel to an interface is given by $E_{\|} = E \sin \theta$, while the electric field perpendicular to an interface is given by $E_{\perp} = E \cos \theta$ with E being the electric field at the interface. The magnitude of magneto-seismic response is proportional to the time-varying differential Lorentz force ΔF$_{\parallel Lorentz}$. According to Equation (3), the optimal design for magneto-seismic survey is to maximize the magnitude of parallel electric field E$_\parallel$ at the target interface. The perpendicular component of the electric field does change across the interface 330, and may give rise to an electrokinetic response, as discussed in the Background above. However, due to charge conservation, the associated electric current densities are equal to each other (i.e., J$_{1,\perp}$=J$_{2,\perp}$=J$_\perp$). Therefore, there is no associated jump in the Lorentz force, and no magneto-seismic wave is launched. This is one of the features that allow a magneto-seismic response to be distinguished from an electrokinetic response. Another way to distinguish between these two mechanisms is to change the orientation of the B field with respect to the time-varying electromagnetic field. The magneto-seismic response depends on this relative orientation, whereas the electrokinetic response does not depend on this relative orientation.

To provide a more quantitative understanding of the present invention, FIGS. 4, 5, 6, 7, and 8 consider how an electromagnetic plane wave interacts with a layer in a subsurface region to produce a magneto-seismic response. A simple layered Earth model may be considered in which the layers may be parallel to the x-direction and the electromagnetic wave may be incident from the z-direction. The electric field may oscillate in the x-direction (i.e., E$_x$(t)) which is perpendicular to the direction of electromagnetic wave propagation. In these examples, the B field may be the Earth's magnetic field B$_{Earth}$, which may be taken to be in the y-direction and is perpendicular to the electric field E$_x$. In this configuration, time-varying oscillations in the electric field may produce a p-wave seismic response (i.e., no s-waves). A physical realization of this type of electromagnetic plane wave may be a magnetotelluric wave that is typically generated by lightning and/or fluctuations in the Earth's ionosphere. These magnetotelluric plane waves form the basis of an electromagnetic geophysical method that has been extensively used by geoscientists to image deep into the Earth. In these examples, the seismic response may be normalized to the maximum amplitude of the incident electric field. It should be noted that, when magnetotelluric waves are used as the source of the oscillatory electric field, no power supply or electrodes are required. In the examples shown in FIGS. 4-8, the time variance of the incident electromagnetic wave is taken to be that of a Ricker wavelet. Although magnetotelluric waves do not have the temporal shape of a Ricker wavelet, it may be possible to use well-known processing methods to create a Ricker response from cross correlation of recordings of the electric field and the seismic response.

Figure 4B:
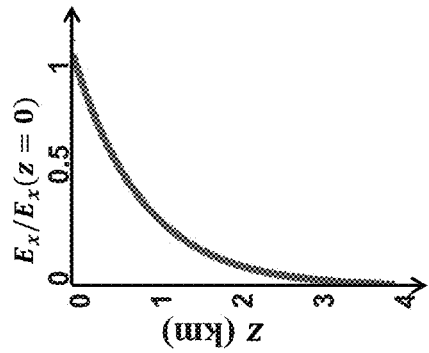
FIGS. 4A-4D illustrate a conceptual model for an onshore magneto-seismic exploration and its associated signals according to an embodiment of the present disclosure.
Figure 4A:
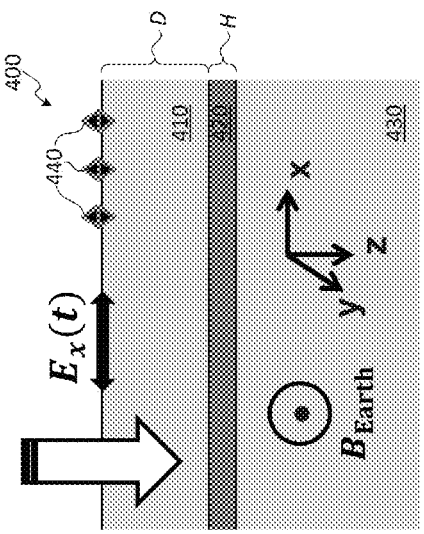

FIGS. 4A-4D illustrate a conceptual model for an onshore magneto-seismic exploration and its associated signals according to an embodiment of the present disclosure. FIG. 4A depicts a layered Earth model 400 for the onshore exploration. The Earth model 400 includes a first layer 410, a second layer 420, and a third layer 430. The first layer 410 and the third layer 430 may be modeled to be saturated with brine, while the second layer 420 may denote a hydrocarbon saturated reservoir layer. Accordingly, the first layer 410 and the third layer 430 have relatively higher conductivities than the second layer 420. The first layer 410 has a thickness D and the second layer 420 a thickness H. A three-layer model is used to demonstrate the dependence of the seismic response on the thickness H of the hydrocarbon layer and the depth of the hydrocarbon layer (which is D in this model), as will be discussed below.

As shown in FIG. 4A, a time-varying electric field E$_x$(t) may be applied in the x-direction at the surface of the first layer 410 and the Earth's magnetic field B$_{Earth}$ points in the y-direction. In this case, the electric field E$_x$(t) is a plane wave that is spatially uniform in the x- and y-directions and attenuates in the z-direction, as illustrated in FIG. 4B. The attenuation is dependent on the skin depth, which is a function of layer conductivities and a frequency of the electric field E$_x$(t).

The seismic response may be obtained by solving an electric field distribution under the subsurface, calculating the Lorentz body force, plugging the Lorentz body force into elastic wave equations, and matching boundary conditions at each layer interface. The solution obtained may be approximately the same as that for an exploding reflector placed at each interface that launches a seismic wave that is determined by the jump of the Lorentz force across the interface. The jump in the Lorentz force is determined by local conductivity jumps and the local electric and magnetic fields at the interface.

In order to produce a seismic response, a time-varying electric field in the form of, for example, a Ricker wavelet, may be applied to the first layer 410 as shown in FIG. 4A. The time-varying electric field may be defined by the following equation:

$$E_x(t)=E_0(1-2\pi^2 f^2 t^2)\exp(-\pi^2 f^2 t^2) \qquad (4)$$

In equation (4), E$_0$ is the amplitude and f is the center frequency of the Ricker wavelet. In this example, a calculation is carried out by using the following parameters: f=15 Hz, B$_{Earth}$'s intensity=45 µT, H=1.6 km, and D=1.5 km. The conductivities of the first layer 410 and the third layer 430 are 0.5 S/m, and the conductivity of the second layer 420 is 0.025 S/m. The mechanical properties are assumed to be the same in each geologic layer—the density of rock is 2500 kg/m$^3$ and the p-wave velocity is 3162 m/s.

The resulting seismic response, in terms of an acceleration a$_z$ (units: m/s$^2$) in the z-direction normalized by the amplitude E$_0$ (units: V/m) versus time (unit: s), as measured by receivers 440 at the surface of the first layer 410 is shown by the seismic signal in FIG. 4C. The seismic signal in FIG. 4C is dominated by a first seismic pulse 450, which is an instantaneous response recorded by the receivers 440 due a direct coupling to the source of the Ricker wavelet. The first pulse 450 is also in the Ricker wavelet form. The first pulse 450 may be referred to as a "source pickup" pulse.

Figure 4D:
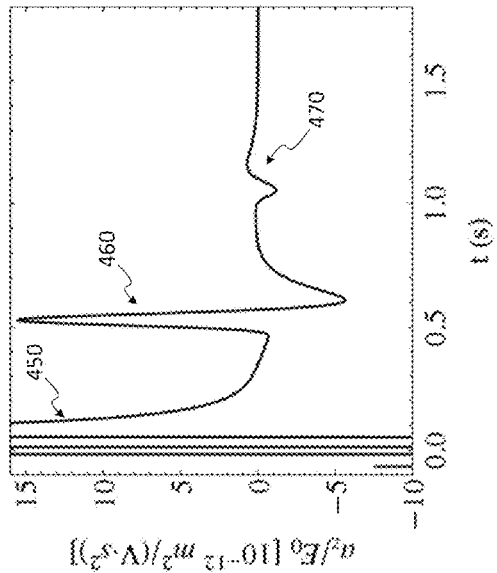
Figure 4C:
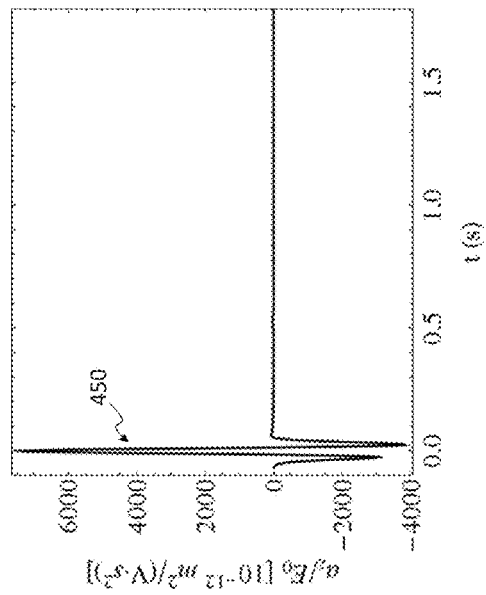

Once the scale of the y-axis of FIG. 4C is changed and the magnitude of the source pickup pulse 450 significantly exceeds the scope of the scale, as shown in FIG. 4D, a second seismic pulse 460 and a third seismic pulse 470 are revealed. The second seismic pulse 460 is generated at the interface between the first layer 410 and the second layer 420 due to an abrupt change in Lorentz force. Compared to the first seismic pulse 450, the second seismic pulse 460 is delayed by a seismic one-way travel time over a depth equal to the thickness D of the first layer 410. The third seismic pulse 470 is generated at the interface between the second layer 420 and the third layer 430, and has an opposite polarity to that of the second seismic pulse 460 because of the opposite sign in the conductivity contrast between the adjacent layers. Compared to the first seismic pulse 450, the third seismic pulse 470 is delayed by the seismic one-way travel time over a total depth D+H. The waveforms of the second seismic pulse 460 and the third seismic pulse 470 track the time variance of the local tangential electric fields at the interfaces and are different from the injected Ricker wavelet because the electromagnetic radiation propagates diffusively in the Earth. In other words, the diffusive nature of the electromagnetic wave causes the third seismic pulse 470 to be attenuated in comparison with the second seismic pulse 460.

Figure 5B:
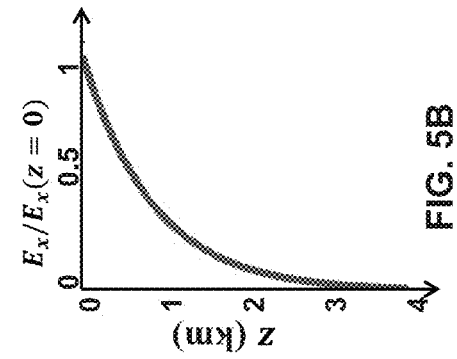
FIGS. 5A-5D illustrate a conceptual model for an offshore magneto-seismic exploration and its associated signals according to an embodiment of the present disclosure.
Figure 5A:
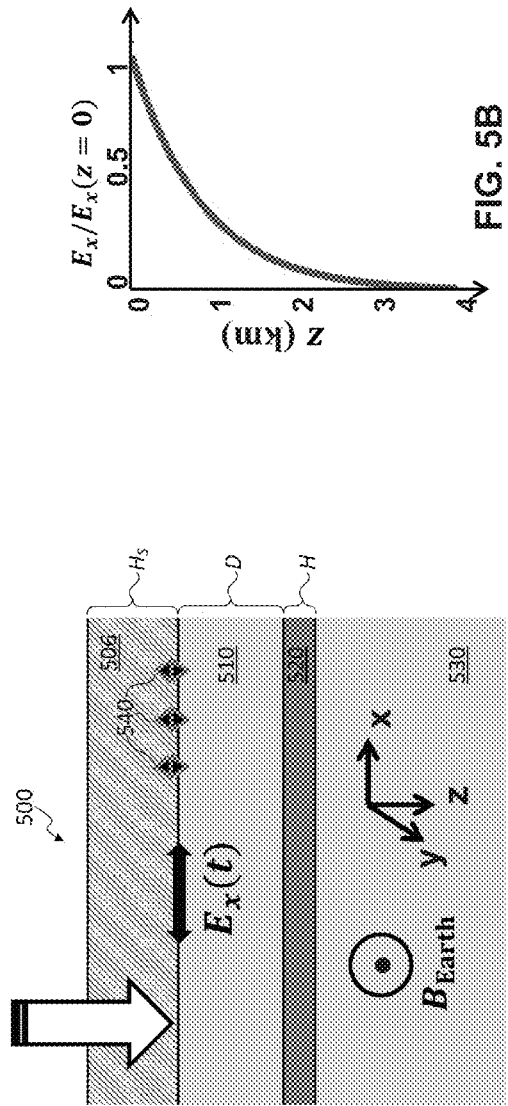

FIGS. 5A-5D illustrate a conceptual model for an offshore magneto-seismic exploration and its associated signals according to an embodiment of the present disclosure. FIG. 5A depicts a layered Earth model 500 for the offshore exploration. The Earth model 500 includes a sea column 506, a first layer 510, a second layer 520, and a third layer 530. The first layer 510 and the third layer 530 may be modeled to be saturated with brine, while the second layer 520 may denote a hydrocarbon saturated reservoir layer. Accordingly, the first layer 510 and the third layer 530 both have notably higher conductivities than the second layer 520. The sea column 506 has a thickness $H_S$, the first layer 510 a thickness D, and the second layer a thickness H.

As shown in FIG. 5A, a time-varying electric field $E_x(t)$ may be applied in the x-direction at the surface of the first layer 510 and the Earth's magnetic field $B_{Earth}$ points in the y-direction. The electric field $E_x(t)$ is spatially uniform in the x- and y-directions and attenuates in the z-direction, as illustrated in FIG. 5B. Similar to the onshore exploration method, described above, the electric field $E_x(t)$ may be in the form of a Ricker wavelet with a center frequency f and an amplitude $E_0$, as in equation (4).

In this example, a calculation is carried out by using the following parameters: f=15 Hz, $B_{Earth}$'s intensity=45 µT, H=1.6 km, and D=1.5 km. To illustrate the effect of the thickness of the sea column 506, $H_S$ is set to 2 km and 200 m, corresponding to FIGS. 5C and 5D, respectively The conductivity of the sea column 506 is 3 S/m. The conductivities of the first layer 510 and the third layer 530 are 0.5 S/m, and the conductivity of the second layer 520 is 0.025 S/m. The mechanical properties are assumed to be the same in each geologic layer—the density of rock is 2500 kg/m³ and the p-wave velocity is 3162 m/s.

Figure 5D:
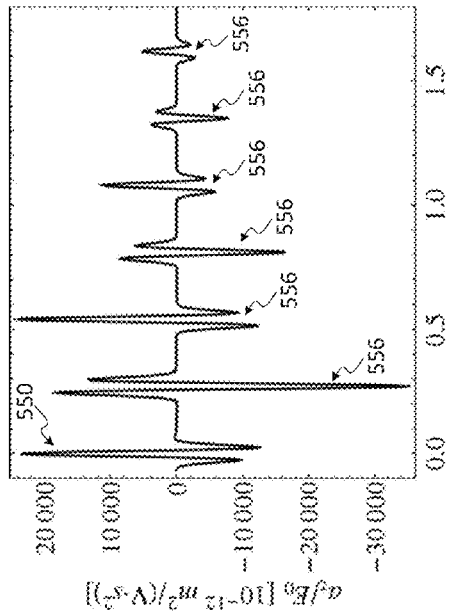
Figure 5C:
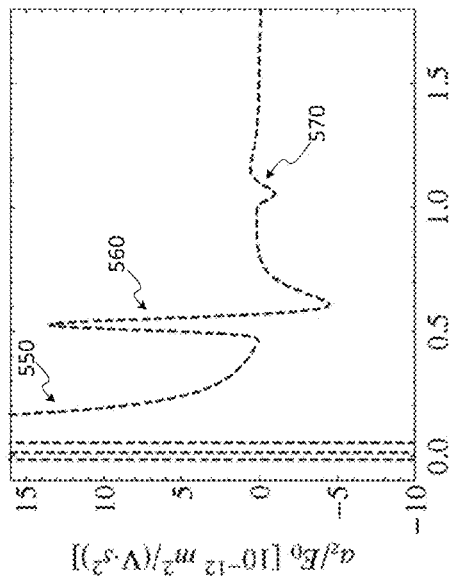

When the thickness $H_S$=2 km, the resulting seismic response, in terms of acceleration $a_z$ in the z-direction normalized by the amplitude $E_0$ versus time, as measured by receivers 540 at the surface of the first layer 510 is shown by the seismic signal in FIG. 5C. The seismic signal in FIG. 5C includes a first seismic pulse 550, a second seismic pulse 560 and a third seismic pulse 570. The first seismic pulse 550 is the source pickup pulse. The second seismic pulse 560 is generated at the interface between the first layer 510 and the second layer 520 due to a difference in Lorentz force between the two interfaced layers. Compared to the first seismic pulse 550, the second seismic pulse 560 is delayed by a seismic one-way travel time over a depth equal to the thickness D. The third seismic pulse 570 is generated at the interface between the second layer 520 and the third layer 530, and has an opposite polarity to that of the second seismic pulse 560 because of the opposite sign in the conductivity contrast between the adjacent layers. Compared to the first seismic pulse 550, the third seismic pulse 570 is delayed by the seismic one-way travel time over a total thickness D+H. The waveforms of the second seismic pulse 560 and the third seismic pulse 570 track the time variance of the local tangential electric fields at the interfaces and are different from the injected Ricker wavelet because the electromagnetic radiation propagates diffusively in the Earth. The amplitude of the subsequent peaks is attenuated as a result of such diffusion.

FIG. 5D illustrates the resulting seismic signal when the thickness $H_S$=200 m. In this case, the seismic signal includes the source pickup pulse 550 and multiple reflection pulses 556, which result from the source pickup pulse 550 at the sea floor being reflected back and forth between the air/sea interface and the sea floor. These reflection pulses 556 may interfere with and overlap the seismic pulses generated due to differential Lorentz forces at the top and bottom surfaces of the second layer 520. In order to create a clearer image of seismic pulses arriving from the interfaces of the second layer 520, the multiple reflection pulses 556 may be ignored. Typically, these multiple reflection pulses 556 may be removed from the detected seismic signal and from further processing. Once the multiple reflection pulses 556 are removed, the seismic pulses from the interfaces of the second layer 520 may be revealed. It should be noted that reflection pulses are also present in the scenario where the thickness $H_S$=2 km (i.e., FIG. 5C), but, due to the relatively deeper sea column, the reflection pulses arrive at the receivers 540 at much later times. Therefore, the reflection pulses do not show up on the scale used in FIG. 5C and do not interfere with or overlap the second seismic pulse 560 and the third seismic pulse 570.

In magneto-seismic explorations, such as the embodiments illustrated in FIGS. 1 and 2, seismic responses come primarily from the Lorentz force generated by the Earth's magnetic field and the currents transmitted into the subsurface by electrodes. As such, the orientation of the electrodes with respect to the Earth's magnetic field is important. For maximum magneto-seismic p-wave response, it is preferred that the electrodes be oriented so that the electric field at depth tends to be perpendicular to a component $B_{\|Earth}$ of the Earth's magnetic field that is parallel to a surface of a target subsurface formation. To maximize recording of the magneto-seismic p-wave signal, it is preferable to locate the receivers over regions where the electric field at depth tends to be parallel to the surfaces of the target. In general, the regions are between the electrodes.

The time response of the pulses received at surface by receivers (e.g., the receivers 440, 540) identifies the depth from which the pulses come. The pulses may also be migrated using one-way timing to produce conductivity images of the subsurface. Signs of conductivity jumps at interfaces may be determined from whether the pulses are predominantly in phase or predominantly 180-degrees out of phase with the oscillating electric field. It should be noted that the conductivity images or maps may not directly provide values for the conductivities of identified subsurface formations. Instead, inversion processing may be employed to determine the actual conductivities of the different subsurface formations.

Referring back to the seismic signal in FIG. 4D (or FIG. 5C), it can be observed that the first seismic/source pickup pulse 450 (or 550), the second seismic pulse 460 (or 560), and the third seismic pulse 470 (or 570) reach the receivers at distinct times and are clearly distinct from one another, thanks to the thickness H of the second layer 420 (or 520) being modeled at 1.6 km and the Ricker wavelet frequency f being set at 15 Hz. In such a scenario, the depth and thickness of the hydrocarbon layer may be determined by the one-way travel time of the second and third pulses relative to the first pulse. However, if the thickness H is decreased and/or the frequency f is decreased, the three pulses may not be distinguishable from one another, and the depth and thickness of the hydrocarbon layer may not be adequately determined. FIGS. 6A-6C illustrate examples of magneto-seismic signals with the thickness H of the second layer 420 decreased to 20, 100, and 200 m and the Ricker wavelet frequency f set at 0.5, 5, and 15 Hz, respectively.

The thickness D of the first layer 410 is kept at 1.5 km and all other parameters used in the calculation remain unchanged.

In FIG. 6A, at a low frequency f of 0.5 Hz, the electric field is the least attenuated when propagating into the Earth. However, the ramification of such a low frequency is that the source pickup pulse is temporally spread out (i.e., a lower frequency implies a longer time period). Consequently, the seismic pulses from the top and bottom surfaces of the second layer 420 arrive at times that overlap the source pickup pulse, creating one single pulse 610, which encompasses the three overlapping seismic pulses. Therefore, the three seismic pulses are smeared and may not be resolved. Therefore, higher frequencies are generally more suitable for detecting hydrocarbon deposits that are at shallow depths such that the source pickup pulse does not overlap seismic pulses from the hydrocarbon deposits.

Accordingly, as the frequency f is increased to 5 Hz in FIG. 6B or 15 Hz in FIG. 6C, a source pickup pulse 620 is temporally less spread out as can be observed by time scale on the x-axis. As such, the source pickup pulse 620 does not overlap a seismic pulse 630, thereby improving subsequent processing of the measured data. In particular, the depth of the second layer 420 may be determined. However, unlike the seismic signal in FIG. 4D, there are no distinct second and third pulses coming from the top and bottom surfaces of the second layer 420. Here, at 20, 100, or 200 m, the thickness H is much less than the 2 km used in FIG. 4D. As a result, the seismic pulses from the top and bottom surfaces of the second layer 420 reach the receivers temporally closer and overlap each other, creating the single seismic pulse 630. In such a case, the thickness of the second layer 420 may not be adequately determined.

Moreover, since the seismic pulses from the top and bottom surfaces of the second layer are of opposite polarity, they overlap each other and there is an undesirable destructive interference, which reduces the signal to noise ratio. As the thickness H decreases, the destructive interference increases, as can be observed by the amplitude of the seismic pulse 630 as the thickness H is decreased from 20 to 100 to 200 m. Increasing the frequency f even further may prevent this destructive interference and the seismic signals from the top and bottom surfaces of the second layer 420 from overlapping. However, the drawback of excessive increase in frequency is that, as the frequency f increases, the amplitude of the seismic signal decreases thereby diminishing the signal to noise ratio. Such undesirable consequence is apparent once the peak amplitudes of the seismic pulses 630 in FIGS. 6B and 6C are compared. Thus, it may be recommended to set the source frequency in order to achieve balance between achieving strong and yet distinguishable pulses at the same time.

Figure 7:
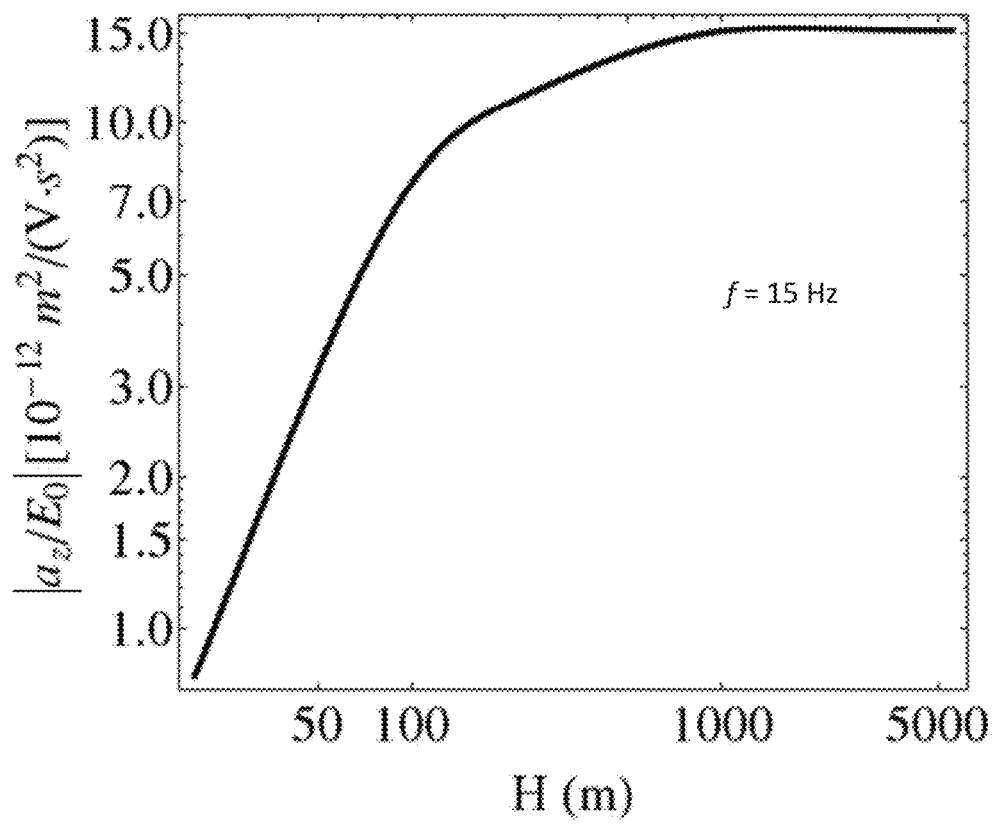
FIG. 7 illustrates an amplitude of a seismic signal from a hydrocarbon layer versus a thickness of the hydrocarbon layer according to an embodiment of the present disclosure.

FIG. 7 illustrates the amplitude of seismic response peak at a one-way travel time from the depth D versus the thickness H of the second layer 420, at a frequency f of 15 Hz. As the thickness H decreases and becomes much smaller than a seismic wavelength of the electric field, a destructive interference between the seismic pulses from the top and bottom surfaces of the second layer 420 increases and the amplitude of the seismic response peak decreases, as discussed above. For a resistive layer thickness H comparable to or larger than the seismic wavelength, the amplitude of seismic response at one-way travel time from the top surface of the second layer 420 is independent of the thickness H as there may not be any destructive interference. In FIG. 6D, this can be observed by the fact the amplitude plateaus when the thickness H is greater than about 1000 m. This can also be observed in FIG. 4D, where the second seismic signal 460 is distinct from the third seismic signal 470 when the thickness H is set at 2000 m. However, as the thickness H gets smaller, higher frequencies (i.e., shorter seismic wavelengths) would be needed to resolve the seismic pulses from the top and the bottom surfaces of the resistive second layer 420.

Figure 8A:
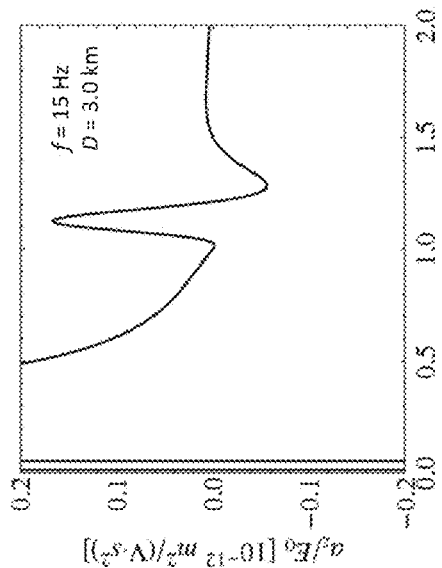
FIGS. 8A-8D illustrate examples of magneto-seismic signals at different depths of a hydrocarbon layer and different source frequencies according to an embodiment of the present disclosure.
Figure 8B:
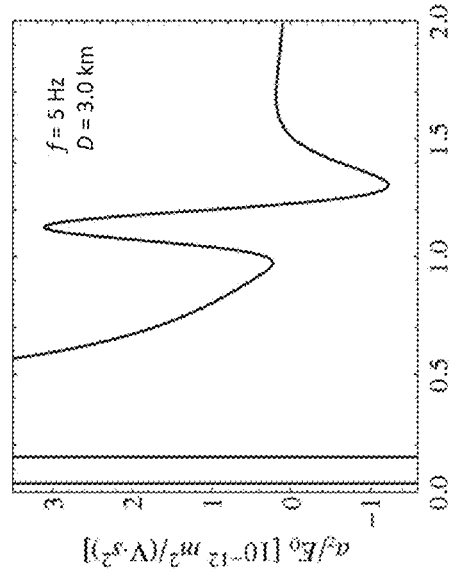
Figure 8C:
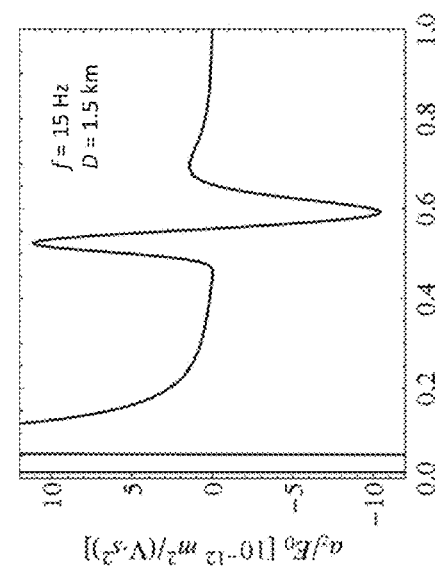
Figure 8D:
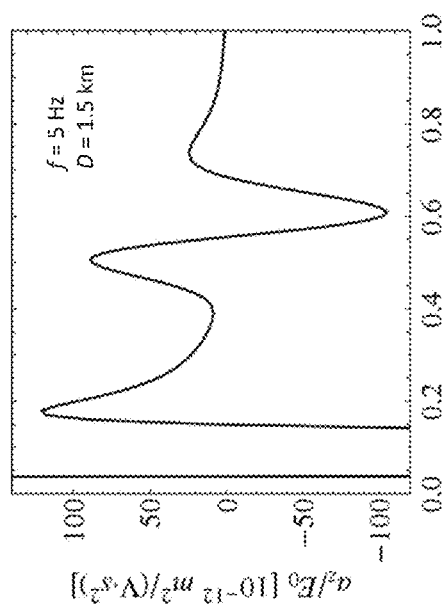

FIGS. 8A-8D illustrate examples of magneto-seismic signals when increasing the depth of the second layer 420 at different frequencies according to an embodiment of the present disclosure. In FIGS. 8A and 8B, the thickness D of the first layer 410 is changed from 1.5 km to 3.0 km, respectively, while keeping the frequency f of Ricker wavelet at 15 Hz. In FIGS. 8C and 8D, the thickness D of the first layer 410 is changed from 1.5 km to 3.0 km, respectively, while keeping the frequency f of Ricker wavelet at 5 Hz. In these examples, the thickness H of the second layer 420 is kept fixed at 200 m.

As can be seen in FIGS. 8A and 8B, doubling the thickness D doubles the arrival time of the seismic pulses from the top surface of the second layer 420 and considerably attenuates the amplitude of the seismic pulses. This is due to the fact the electric field propagates diffusively into the Earth, and the diffusivity increases as the frequency of the electric field increases. Therefore, it is desirable to decrease the frequency f as the depth of a subsurface formation of interest increases. Indeed, when comparing FIG. 8B with FIG. 8D, for the thickness D at 3.0 km, decreasing the frequency f from 15 Hz to 5 Hz increases the amplitude of the seismic pulses from the second layer 420. Similarly, when comparing FIG. 8A with FIG. 8C, for the thickness D at 1.5 km, decreasing the frequency f from 15 Hz to 5 Hz increases the amplitude of the seismic pulses from the second layer 420.

From the above discussion, it is clear that a frequency of an electric field used for magneto-seismic exploration must be carefully chosen based on any a priori or estimated geophysical data available about the resistive layer under investigation. As mentioned, for shallow hydrocarbon deposits, relatively higher frequencies are desired to prevent seismic pulses from the hydrocarbon deposits from being lost in the source pickup pulse. For deeper hydrocarbon deposits, relatively lower frequencies are desired such that the electric field does not get overly attenuated as it propagates into the Earth. However, the frequency must be kept high enough to prevent destructive interference between seismic pulses from the top and bottom surfaces of a hydrocarbon deposit and allow for the thickness of the hydrocarbon deposit to be resolved.

Several different acquisition strategies may be used to detect magneto-seismic responses. One of these strategies involves broadcasting a coded pulse or waveform sequence, such as a Golay wave, and time-time correlating the data with the time-varying electric field at the Earth's surface. The current flowing to the electrodes may be used in many instances as a proxy for the electric field. Due to the large instantaneous response (i.e., source pickup pulse), the seismic acquisition system has to have sufficient dynamic range to be able to accurately record seismic pulses from subsurface resistive layers that may be superimposed on the instantaneous response (i.e., the source pickup pulse). It is preferred that the seismic signal be recorded with an acquisition system that digitizes the seismic signal with at least 24-bit resolution and more preferably using a system that has at least 32-bit resolution. Another acquisition strategy involves broadcasting individual pulses or waveforms and recording the seismic response before injecting another pulse.

Since seismic pulses produced from subsurface resistive layers may be weak, it may be advantageous to use multiple repetitions and then average the acquired seismic data. It may be preferred that the number of repetitions be greater than 10 and more preferably greater than 1,000 and even more preferably greater than 10,000. To enhance the seismic signal it may be preferable that the peak current injected into the ground be greater than 1 ampere when the waveform is applied. More preferably the peak current may be greater than 10 amperes, and more preferably greater than 100 amperes.

Figure 9:
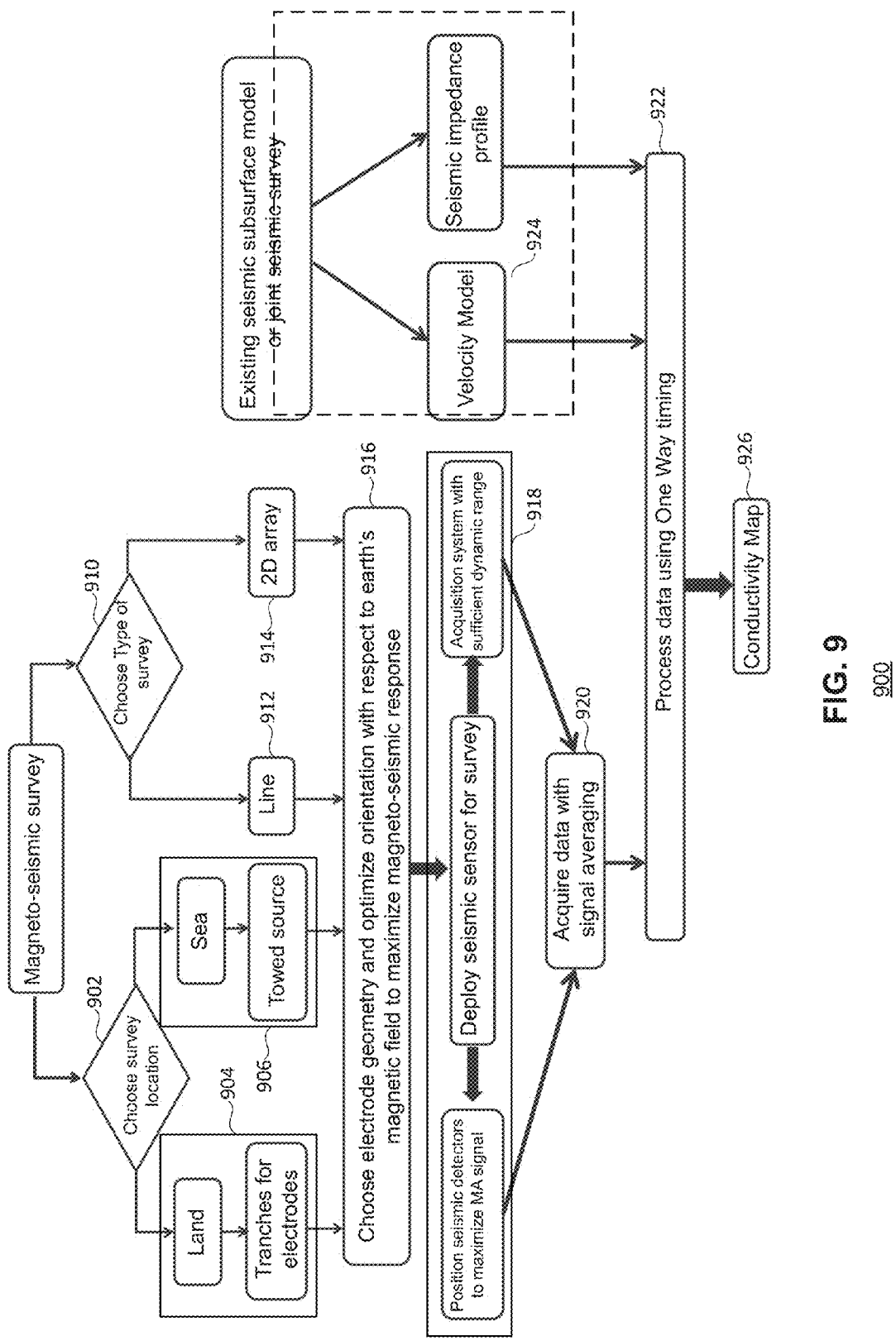
FIG. 9 illustrates a method for magneto-seismic surveying according to an embodiment of the present disclosure.

FIG. 9 illustrates a method 900 for magneto-seismic surveying from the surface according to an embodiment of the present disclosure. The method 900 starts at step 902, where the survey location is chosen. If the survey location is onshore, it may be decided to dig trenches for source electrodes at step 904 and the receivers may be placed in the ground. At step 904, the type of seismic receiver used is chosen. If the survey location is offshore, it may be decided that the source electrodes be towed at step 906 and the type of receiver such as a towed hydrophone array or an ocean bottom node may be chosen. At step 910, the method 900 chooses the type of survey, in particular whether seismic receivers/detectors are to be placed in a line at step 912 or in a two-dimensional array at step 914. Placement of receivers in steps 912 and 914 may include a decision as to whether, in offshore settings, the receivers should be towed.

Once the survey location and the type of survey are chosen, the method 900 moves to step 916 where the source electrode geometry and orientation are chosen with respect to the Earth's magnetic field (which may be known from other recorded geophysical data) to tailor the magneto-seismic response. It may be preferable to choose multiple source orientations, for example, in order to distinguish the magneto-seismic response from any electrokinetic response that may be present. Unlike the magneto-seismic response, the electrokinetic response does not depend on the orientation of the B field with respect to the electromagnetic source. For example, the same area may be surveyed twice, with the electromagnetic source oriented in orthogonal directions, one substantially parallel to, and one substantially perpendicular to, the B field. Alternatively, multiple sources with different orientations may be deployed simultaneously. At step 916, the type of source and pulse sequence is also chosen. Then, at step 918, the seismic sensors, including detectors and an acquisition system having sufficient dynamic range, may be deployed. The detectors may be positioned to maximize seismic pulses that may be recorded from subsurface formations. Once deployed and the source electrodes are activated, at step 920, the seismic sensor may start acquiring data with signal averaging (as discussed above).

At step 922 of the method 900, the acquired data may be processed, with a computer system, using one-way timing. Optionally, as shown by block 924, existing seismic subsurface models or a seismic survey conducted jointly with the magneto-seismic survey may provide velocity models, seismic impedance profiles, and other pertinent data such that acquired data from step 920 may be corroborated at step 922 and/or more data may be available for an inversion process by the computer system. At step 926, one or more conductivity maps may be constructed based on the data from step 922. Additionally, at step 926, an inversion process may be employed to determine conductivity values for the identified subsurface formations.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure. Further variations are permissible that are consistent with the principles described above. A few of the variations of that may exist when the invention is used in conjunction with a wellbore will be briefly discussed.

One variation of the invention that may be used in conjunction with a wellbore may be to place a seismic receiver or a plurality of seismic receivers in the wellbore. In this embodiment, the source and electrodes may remain on the surface and the B field may be either that of the Earth or that of a source (electromagnet or permanent magnet) at the surface of the Earth.

Another variation that may be used in conjunction with a wellbore is to arrange the electrodes so that at least one electrode may inject a current from the wellbore into the subsurface. One configuration may have two electrodes connected with a power source in a manner such that one electrode may inject a current at the surface of the Earth and the other electrode may inject a current at depth into the subsurface from the wellbore. This may be a type of electrode configuration that was commonly used for resistivity logging 50-75 years ago. In another configuration, each of the electrodes may be placed in the wellbore and may inject currents at depth from the wellbore. This type of electrode configuration has been used in more modern resistivity logging. Most recently, resistivity logging tools have used multiple electrodes to inject and focus current into the subsurface. These types of electrode configurations may also be used with the current invention. When the electrodes are in the subsurface, waveforms with higher frequency content may be used. For investigations of magneto-seismic response in the wellbore region, waveforms with frequencies as high as $10^6$ Hz, or alternatively $10^5$ Hz, or alternatively $10^4$ Hz, or alternatively $10^3$ Hz may be used. As shown earlier, higher frequency content waveforms will decrease the depth of penetration of the waveform. Hence, as the frequency content of the waveform increases, the region in which the conductivity may be mapped will move closer and closer to the wellbore. When higher frequency waveforms are used, receivers other than those routinely used in seismic exploration must be used to detect the elastic wave. Examples of these types of receivers may be ultrasonic transducers, high frequency hydrophones as well as many others known to those skilled in the art. Because of attenuation of higher frequency elastic waves, these receivers generally have to be located in the wellbore.

In yet another embodiment, the B field source (such as an electromagnet or a permanent magnet) may be located in the wellbore. This has the advantage of increasing the Lorentz force from selected layers in the subsurface, and enabling the ability to change the orientation of the B field with respect to the time-varying electromagnetic field without changing the latter. This embodiment may be used in conjunction with any of the other embodiments that have been disclosed.

What is claimed is:

1. A method for a magneto-seismic exploration of a subsurface region, comprising:
    transmitting a time-varying electromagnetic field into a subsurface region, such that a source of the time-varying electromagnetic field is arranged to have a component of an electric field associated with the time-varying electromagnetic field be substantially parallel to an interface, at depth, between two subsurface formations in the subsurface region and be substantially parallel or substantially perpendicular to a component of a magnetic field that is substantially parallel to the interface at depth, wherein the magnetic field is a static or time-varying magnetic field, and the component of the electric field interacts with the component of the magnetic field and creates a Lorentz force in each of the subsurface formations;

detecting, with one or more seismic receivers, a magneto-seismic signal generated by the Lorentz force change at the interface between the two subsurface formations; and using a computer system to process and present the detected magneto-seismic signal.

2. The method of claim 1, wherein the Lorentz force change results from a difference between conductivities of the two subsurface formations.

3. The method of claim 1, wherein the source of time-varying electromagnetic field is an electromagnetic power source.

4. The method of claim 3, further comprising choosing a frequency content of the electromagnetic power source according to a thickness of one of the two subsurface formations.

5. The method of claim 3, further comprising choosing a frequency content of the electromagnetic power source according to a depth of one of the two subsurface formations.

6. The method of claim 3, further comprising choosing one or both of a frequency content and an amplitude of the electromagnetic power source to improve a signal to noise ratio of the detected magneto-seismic signal.

7. The method of claim 3, wherein the electromagnetic power source is coupled to either a pair of railroad track electrodes, a pair of dipole electrodes, or a magnetic induction coil.

8. The method of claim 1, wherein the magnetic field is the earth's magnetic field.

9. The method of claim 1, wherein the magnetic field is generated by an electromagnet or a permanent magnet.

10. The method of claim 1, wherein the time-varying electromagnetic field is transmitted from an earth's surface into the subsurface region.

11. The method of claim 1, wherein the time-varying electromagnetic field is transmitted from a sea or sea floor into the subsurface region.

12. The method of claim 1, wherein the time-varying electromagnetic field is transmitted from a wellbore in the subsurface region.

13. The method of claim 1, wherein at least one of the seismic receivers is located at the earth's surface above the subsurface region.

14. The method of claim 1, wherein at least one of the seismic receivers is located in a sea or on a sea floor above the subsurface region.

15. The method of claim 1, wherein at least one of the seismic receivers is located inside a wellbore in the subsurface region.

16. The method of claim 1, wherein the detected magneto-seismic signal includes one or both of a compressional wave and a shear wave.

17. The method of claim 1, wherein the one or more seismic receivers are configured to detect compressional and shear waves.

18. The method of claim 1, wherein the method further comprises generating, with the computer system, a conductivity map of the subsurface region.

19. The method of claim 1, further comprising orienting electrodes of the source to generate the component of the electric field; and disposing at least one of the one or more receivers between the electrodes.

20. The method of claim 1, further comprising disposing a source of the magnetic field in a wellbore.

21. A system for a magneto-seismic exploration of a subsurface region, comprising:

an electromagnetic power source configured to transmit a time-varying electromagnetic field into a subsurface region, in the presence of a static or time-varying magnetic field, such that the electromagnetic power source of the time-varying electromagnetic field is disposed to have a component of an electric field associated with the time-varying electromagnetic field be substantially parallel to an interface, at depth, between two subsurface formations in the subsurface region and be substantially parallel or substantially perpendicular to a component of a magnetic field that is substantially parallel to the interface at depth, wherein the magnetic field is a static or time-varying magnetic field, and the component of the electric field interacts with the component of the magnetic field and creates a Lorentz force in each of the subsurface formations;

one or more seismic receivers configured to detect a magneto-seismic signal generated by the Lorentz force change at the interface between the two subsurface formations; and a computer system programmed to process and present the detected magneto-seismic signal.

22. The system of claim 21, wherein a frequency range of the electromagnetic power source is chosen according to a thickness of one of the two subsurface formations.

23. The system of claim 21, wherein a frequency range of the electromagnetic power source is chosen according to a depth of one of the two subsurface formations.

24. The system of claim 21, wherein one or both of a frequency content and an amplitude of the electromagnetic power source are chosen to improve a signal to noise ratio of the detected magneto-seismic signal.

25. The system of claim 21, wherein the electromagnetic power source is coupled to one of a pair of railroad track electrodes, a pair of dipole electrodes, and a magnetic induction coil.

26. The system of claim 21, wherein the electromagnetic power source is configured to transmit the time-varying electromagnetic field from the earth's surface into the subsurface region.

27. The system of claim 21, wherein the electromagnetic power source is configured to transmit the time-varying electromagnetic from a sea or sea floor into the subsurface region.

28. The system of claim 21, wherein the electromagnetic power source is configured to transmit the time-varying electromagnetic field from a wellbore in the subsurface region.

29. The system of claim 21, wherein at least one of the seismic receivers is located at the earth's surface above the subsurface region.

30. The system of claim 21, wherein at least one of the one or more seismic receivers is located in a sea or on a sea floor above the subsurface region.

31. The system of claim 21, wherein at least one of the one or more seismic receivers is located inside a wellbore in the subsurface region.

32. The system of claim 21, wherein at least one of the one or more seismic receivers is configured to detect compressional and shear waves.

33. The system of claim 21, wherein the computer system is programmed to process the detected magneto-seismic signal to generate a conductivity map of the subsurface region.

34. The system of claim 21, wherein the transmitted time-varying electromagnetic field has significant energy content in a frequency range between 0.0001 Hz and 10,000 Hz.

* * * * *